United States Patent
Hara et al.

(10) Patent No.: US 7,472,004 B2
(45) Date of Patent: Dec. 30, 2008

(54) STEERING ANGLE SENSOR (75) Inventors: Takeshi Hara, Gunma (JP); Takeshi Ishikawa, Gunma (JP); Toshiyuki Onizuka, Gunma (JP); Shuji Endo, Gunma (JP)

(73) Assignees: NSK Ltd., Tokyo (JP); NSK Steering Co., Ltd., Tokyo (JP)

( * ) Notice: Subject to any disclaimer, the term of this patent is extended or adjusted under 35 U.S.C. 154(b) by 148 days.

(21) Appl. No.: 10/572,504

(22) PCT Filed: Sep. 14, 2004

(86) PCT No.: PCT/JP2004/013709

§ 371 (c)(1),
(2), (4) Date: Mar. 17, 2006

(87) PCT Pub. No.: WO2005/028993

PCT Pub. Date: Mar. 31, 2005

(65) Prior Publication Data

US 2007/0055426 A1   Mar. 8, 2007

(30) Foreign Application Priority Data

Sep. 17, 2003 (JP) ............................ 2003-324479

(51) Int. Cl.
*B62D 6/00* (2006.01)
(52) U.S. Cl. .................. 701/41; 702/150; 702/151; 180/443; 180/446
(58) Field of Classification Search .................. 701/41; 702/150–151; 180/443, 446
See application file for complete search history.

(56) References Cited

U.S. PATENT DOCUMENTS

| 6,191,579 B1 * | 2/2001 | Striker .................. 324/207.25 |
| 6,326,780 B1 * | 12/2001 | Striker .................. 324/207.21 |
| 7,013,233 B2 * | 3/2006 | Block et al. ................. 702/150 |
| 7,073,398 B2 * | 7/2006 | Kondo et al. ........... 73/862.326 |
| 2004/0046624 A1 * | 3/2004 | Schmollngruber et al. .... 335/32 |
| 2006/0290545 A1 * | 12/2006 | Granig et al. ............... 341/118 |
| 2007/0055426 A1 * | 3/2007 | Hara et al. .................... 701/41 |
| 2007/0174015 A1 * | 7/2007 | Steinlechner ................. 702/94 |

FOREIGN PATENT DOCUMENTS

| JP | 4-130216 A | 5/1992 |
| JP | 8-29158 A | 2/1996 |

(Continued)

*Primary Examiner*—Thomas G Black
*Assistant Examiner*—Wae Louie
(74) *Attorney, Agent, or Firm*—Sughrue Mion, PLLC (57) ABSTRACT A steering angle sensor detects a rotational angle of a steering system whose steering is assisted by driving of an electric motor via a reduction mechanism so as to calculate a steering angle of a steering wheel. The steering angle sensor includes: a sensor wheel operating simultaneously with rotation of a steering shaft; and an absolute angle calculating unit for calculating an absolute steering angle based on a steering angle signal from the sensor wheel. The sensor wheel includes a GMR element and a magnetizing portion which is arranged around the GMR element, and the rotational angle is detected by making two turns of the steering shaft as one cycle of the steering angle signal based on a change in resistance value of the GMR element obtained by changing a magnetic field direction according to a rotation of the magnetizing portion.

4 Claims, 8 Drawing Sheets

FOREIGN PATENT DOCUMENTS

| JP | 2001-4313 A | 1/2001 |
| JP | 2001-133211 A | 5/2001 |
| JP | 2002-303536 A | 10/2002 |
| JP | 2002-365043 A | 12/2002 |
| JP | 2003-240598 A | 8/2003 |

* cited by examiner

| ROTATIONAL ANGLE | OUTPUT SIGNAL |  |
|---|---|---|
| 0 | 0000000 | 0000000 |
| 0.04394··· | 1000000 | 0000000 |
| 0.08788··· | 0100000 | 0000000 |
| ⋮ | ⋮ | ⋮ |
| 360 | 0000000 | 0000001 |
| ⋮ | ⋮ | ⋮ |
| 719.9560··· | 1111111 | 1111111 |
| 720 | 0000000 | 0000000 |

STEERING ANGLE SENSOR

FIELD OF THE INVENTION

The present invention relates to improvement of a steering angle sensor for detecting a steering angle of a steering wheel in a steering apparatus.

BACKGROUND OF THE INVENTION

Figure 1:
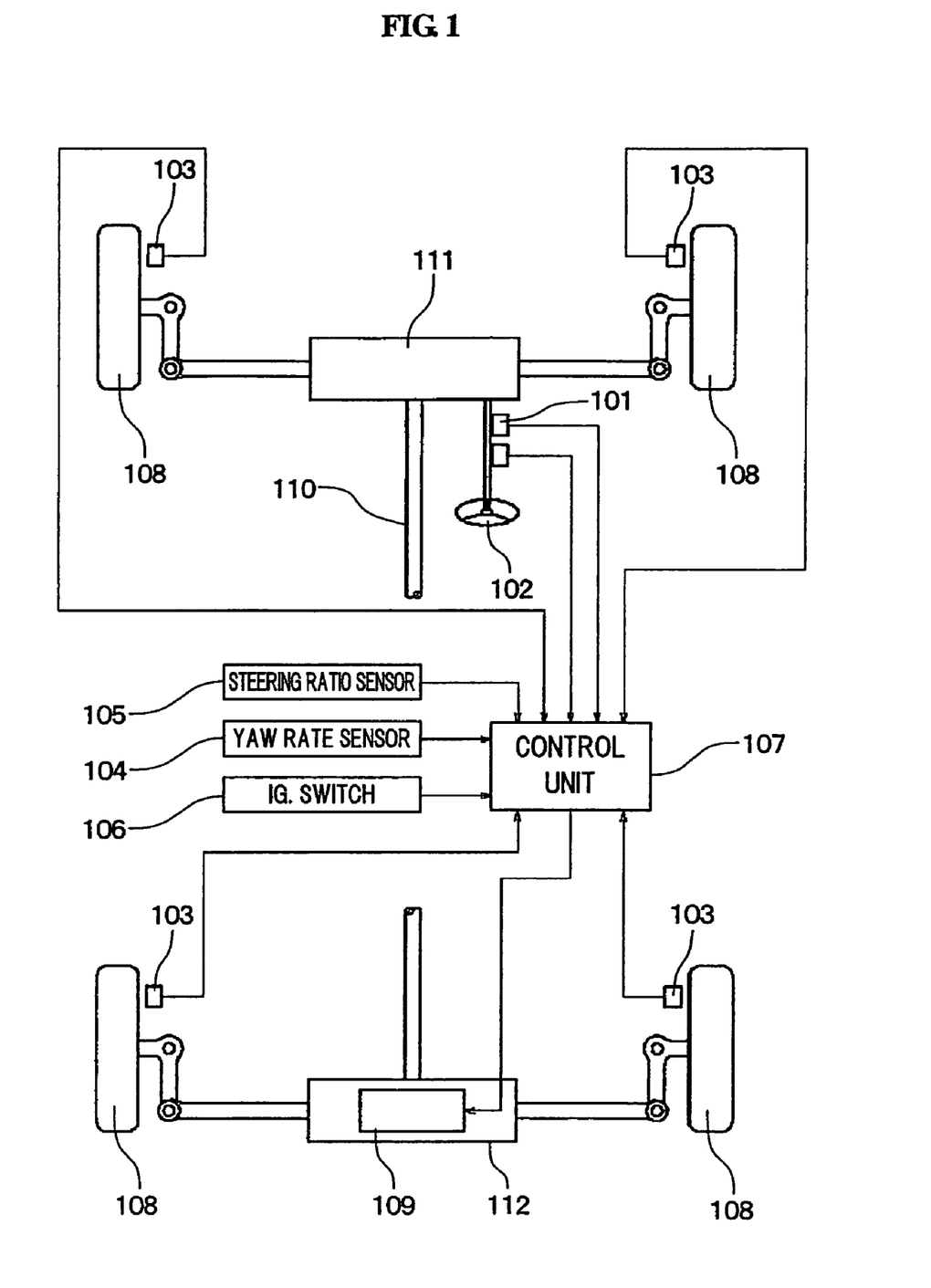
FIG. 1 is a diagram illustrating a steering system of a vehicle having a conventional steering angle sensor.

Such a kind of a steering angle sensor is disclosed in, for example, Japanese Patent Application Laid-Open No. 8-29158, and FIG. 1 is a diagram illustrating a steering system of a vehicle. In this diagram, a steering angle sensor 101 operates simultaneously with a steering wheel 102 in a rotational ratio of 1:1, and an output signal from the steering angle sensor 101 as well as a signal from a wheel velocity sensor 103 for detecting a wheel velocity, a signal from a yaw rate sensor 104 for detecting a yaw rate, a signal from a steering ratio sensor 105 for detecting a steering ratio, a signal from an ignition (IG.) switch 106 and the like is connected to a control unit 107. A steering angle range which is covered by the output signal from the steering angle sensor 101 is divided into three zones: a neutral zone in a predetermined range including at least a neutral position; a right zone; and a left zone adjacent to the neutral zone where output signals from the steering angle sensor 101 show the same value. A determination is made which zone a current steering angle is in based on a velocity difference between right and left wheels, a yaw rate and a vehicle velocity.

The control unit 107 sets a steering angle of a steering wheel based on the signals from the respective sensors and controls an operation of a steering ratio variable mechanism 109 that controls a steering ratio of wheels 108, so that a rear wheel steering mechanism 112 which is linked with a front wheel steering mechanism 111 via a transmission shaft 110 controls the steering angle of rear wheels.

In the steering system disclosed in Japanese Patent Application Laid-Open No. 8-29158, however, since information other than the steering angles, namely, information about the difference in wheel velocity, the yaw rate and the vehicle velocity is necessary in order to detect a rotational angle of the steering wheel, if these pieces of information have an error or abnormality, the determination as to the zone cannot be definitely made. Further, the determination as to the zones cannot be made unless initialization of the information is finished.

Therefore, it is an object of the present invention to provide a steering angle sensor in which a rotating cycle of a sensor wheel having a GMR element (Giant Magnetic Resistance) and a magnetizing portion arranged around the GMR element is improved and a range where a steering angle is detected using the GMR element is enlarged, so that accuracy of a steering angle estimation using the vehicle information can be low, a cost is low and an absolute steering angle can be detected quickly.

SUMMARY OF THE INVENTION

The above object of the present invention is achieved by a steering angle sensor, that detects a rotational angle of a steering system whose steering is assisted by driving of an electric motor via a reduction mechanism so as to calculate a steering angle of steering wheels, comprising: a sensor wheel operating simultaneously with rotation of a steering shaft; and an absolute angle calculating means for calculating an absolute steering angle based on a steering angle signal from the sensor wheel, wherein the sensor wheel includes a GMR element and a magnetizing portion arranged around the GMR element, wherein the rotational angle is detected with two turns of the steering shaft being one cycle based on a change in resistance value of the GMR element obtained by changing a magnetic field direction according to rotation of the magnetizing portion.

The object is achieved effectively by that the GMR element is composed of two GMR bridge circuits, and is arranged so that phases of output signals from the GMR bridge circuits shift by 90°.

Further, the object is achieved effectively by providing a turning direction determining means for determining a turning direction of the steering shaft, and a middle point specific value detecting means for storing a position of a middle point of the steering shaft and detecting a predetermined value near the middle point so as to calculate the absolute steering angle in an entire steering angle range based on the predetermined value.

Further, the object is achieved effectively by that the turning direction determining means can determine the steering angle with accuracy of at least 720°.

According to the steering angle sensor of the present invention, in the case where the steering angle of the steering shaft is detected, the two GMR bridge circuits, which are arranged in the steering angle sensor and composed of GMR element for detecting the angle from the magnetizing portion, are arranged so that their phases shift by 90°, and the steering angle is calculated based on the output signals from the GMR bridge circuits. In this sensor, when a reduction ration between the sensor wheel and the steering shaft is adjusted, the absolute angle can be detected with two turns of the steering shaft being one cycle. As a result, the accuracy of steering angle estimation utilizing wheel information such as a wheel velocity and estimated value of a self aligning torque (SAT) may be a level at which the turning direction can be determining.

Further, a conventional steering angle sensor with one rotational cycle cannot calculate an absolute steering angle without estimating a steering angle based on vehicle information or without a continuous operation at the time of disuse. The steering angle sensor of the present invention, however, detects a specific value of the steering angle near the middle point so as to be capable of calculating the absolute steering angle immediately without requiring the steering angle estimation. As a result, in comparison with the case of only the steering angle estimation, output timing of the absolute steering angle can be sped up, and thus the steering angle accuracy can be consist with the output timing of the absolute steering angle at low cost.

DESCRIPTION OF REFERENCE SYMBOLS

1: steering shaft
7: reduction mechanism
19: steering angle sensor
23: sensor wheel
24: North pole magnet
25: South pole magnet
26: magnetizing portion
27: GMR bridge
27a: first magnetic resistance element (first GMR bridge circuit)
27b: second magnetic resistance element (second GMR bridge circuit)
30: absolute angle calculating means
31: turning direction determination means
32: middle point specific value detecting means

DESCRIPTION OF THE PREFERRED EMBODIMENT

An embodiment of the present invention is explained in detail below with reference to the drawings.

Figure 2:
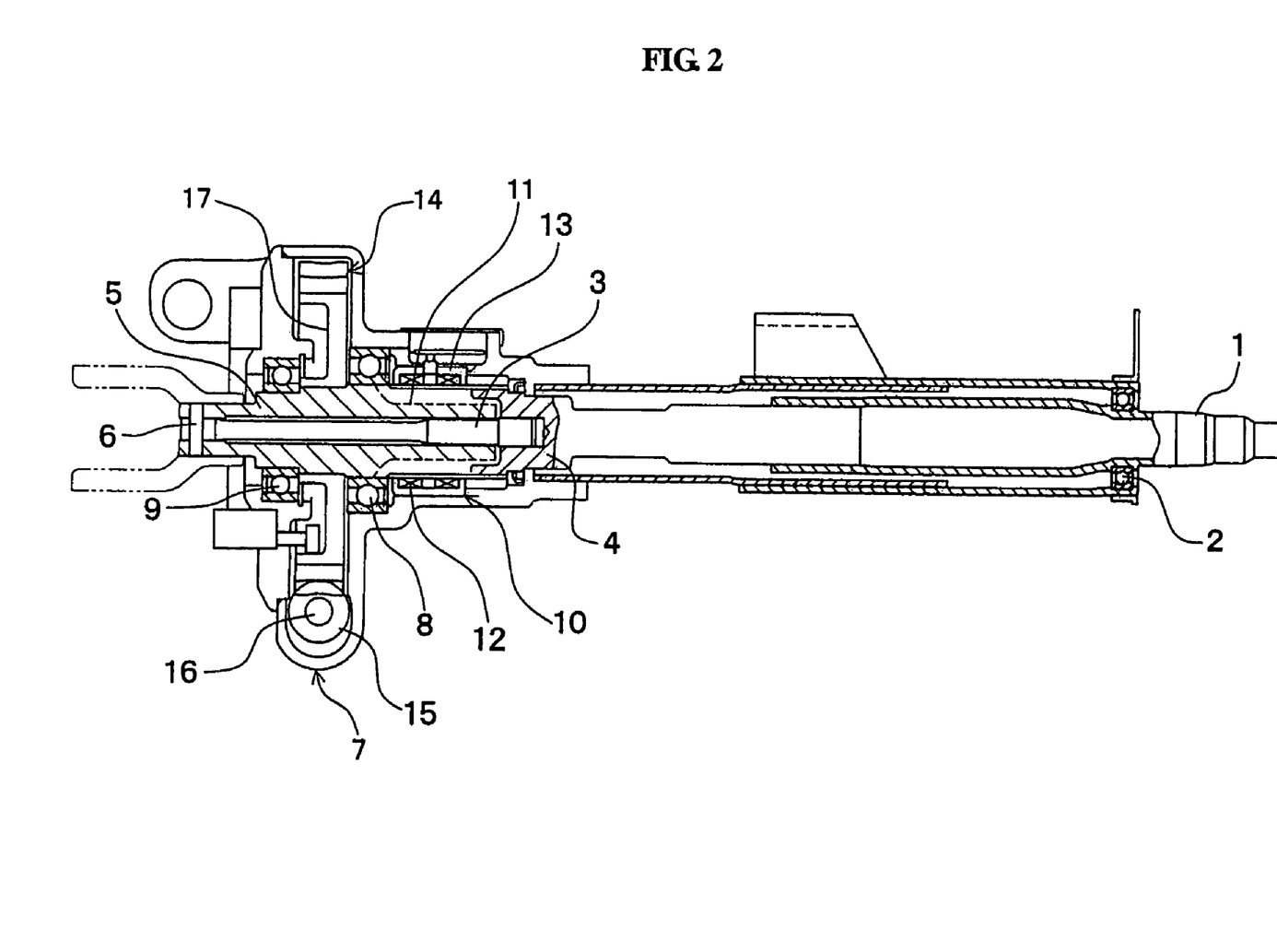
FIG. 2 is a sectional view illustrating a main section of an electric power steering apparatus according to the present invention.

FIG. 2 illustrates a schematic constitution of a general steering system, and a steering shaft 1 is supported by a bearing 2 and freely rotates based on an operation of a steering wheel. An input shaft 4 and an approximately cylindrical output shaft 5 are connected to a base end side (left side in FIG. 2) of the steering shaft 1 via a torsion bar 3. The torsion bar 3 is inserted into an output shaft 5, and its one end is press fitted and fixed to the input shaft 4, and the other end is fixed to the output shaft 5 by a pin 6.

A reduction mechanism 7 is supported to an outer periphery of the output shaft 5 by a pair of bearings 8 and 9, and a torque sensor 10 is arranged at a forward end side (right side in FIG. 2) of the reduction mechanism 7. The torque sensor 10 has the torsion bar 3 and an electromagnetic yoke 13 which is arranged on an outer periphery of a spline groove 11 formed at the forward end of the output shaft 5 and houses a coil winding wire 12. The torque sensor 10 generates torsion of the torsion bar 3 according to a steering torque generated on the steering shaft 1, so that the coil winding wire 12 in the electromagnetic yoke 13 detects a magnetic variation.

Figure 3:
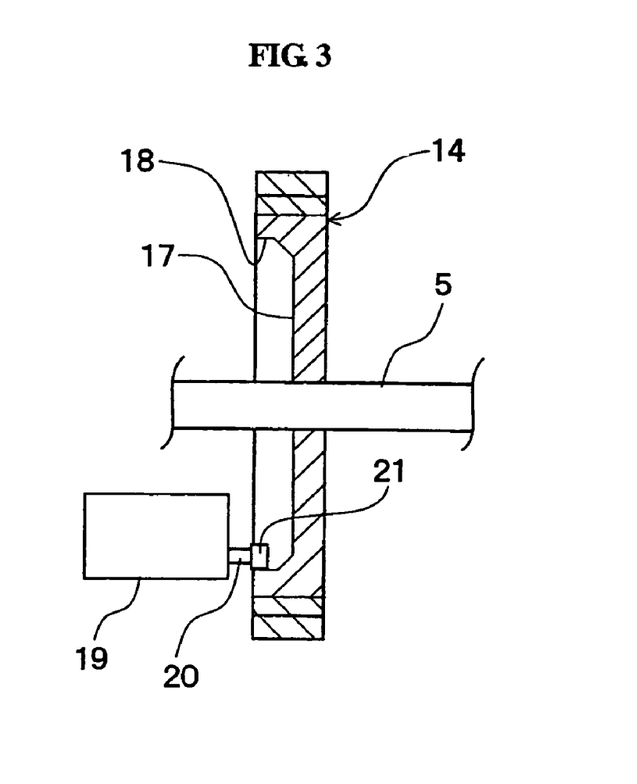
FIG. 3 is a sectional view illustrating a main section of a reduction mechanism.

Further, the reduction mechanism 7 is composed of a worm wheel 14 which is attached to the outer periphery of the output shaft 5 in a fixed manner by press fitting, a worm 15 which engages with the worm wheel 14, and a motor in which the worm 15 is attached to a driving shaft 16. The reduction mechanism 7 reduces rotation of the motor via the worm 15 and the worm wheel 14, so as to transmit an auxiliary torque to the output shaft 5. An approximately circular concave groove portion 17 is formed on a side surface of the worm wheel 14, and as shown in FIG. 3, a gear 18 is formed on an inner periphery of the concave groove portion 17 so as to engage with a sensor pinion 21 at a forward end of a sensor bar 20 of a steering angle sensor 19.

Figure 4:
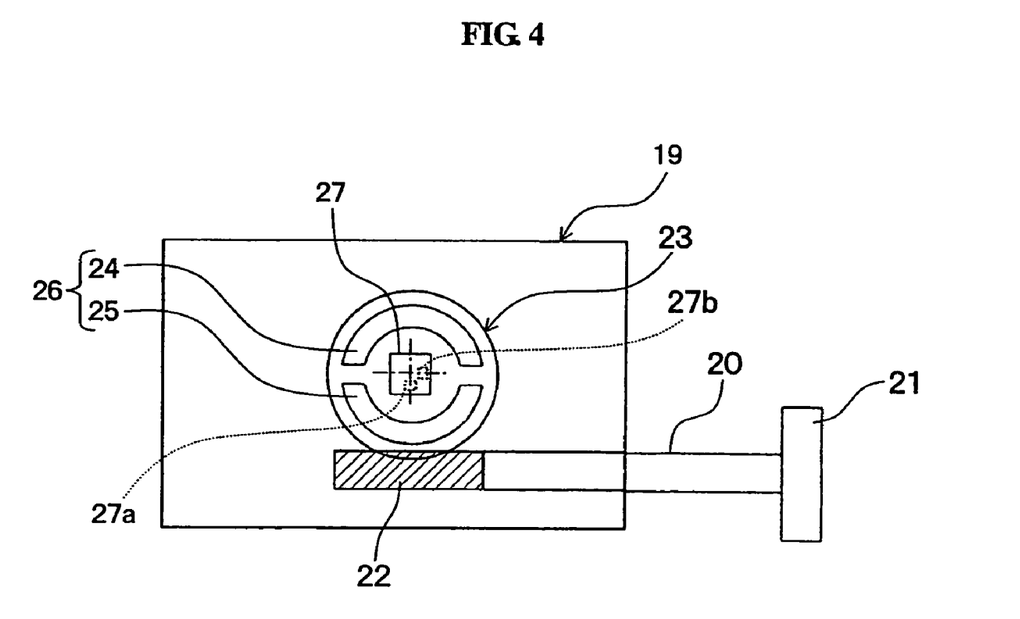
FIG. 4 is a sectional view illustrating a main section of a steering angle sensor.

As shown in FIG. 4, the steering angle sensor 19 contains a sensor wheel 23 which engages with a sensor worm 22 formed on a base end side (left side in FIG. 4) of the sensor bar 20, and rotation of the steering shaft 1 is transmitted from the worm wheel 14 via the sensor pinion 21 and the sensor bar 20 to the sensor wheel 23. Further, the sensor wheel 23 is provided with a magnetizing portion 26 composed of a north pole magnet 24 and a south pole magnet 25, and the magnets 24 and 25 rotate in constant cycle so as to synchronize with the rotation with the steering shaft 1. In this case, a gear ratio is set so that the sensor wheel 23 caracoles with respect to the rotation of the worm wheel 14.

Figure 5:
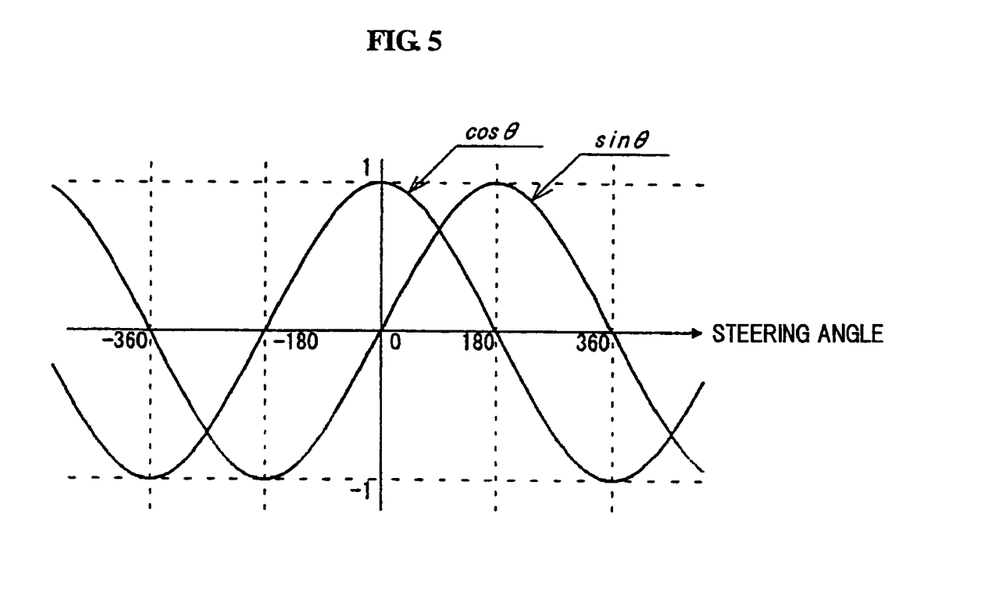
FIG. 5 is a graph illustrating a change in signal between two GMR bridge circuits.
Figure 6:
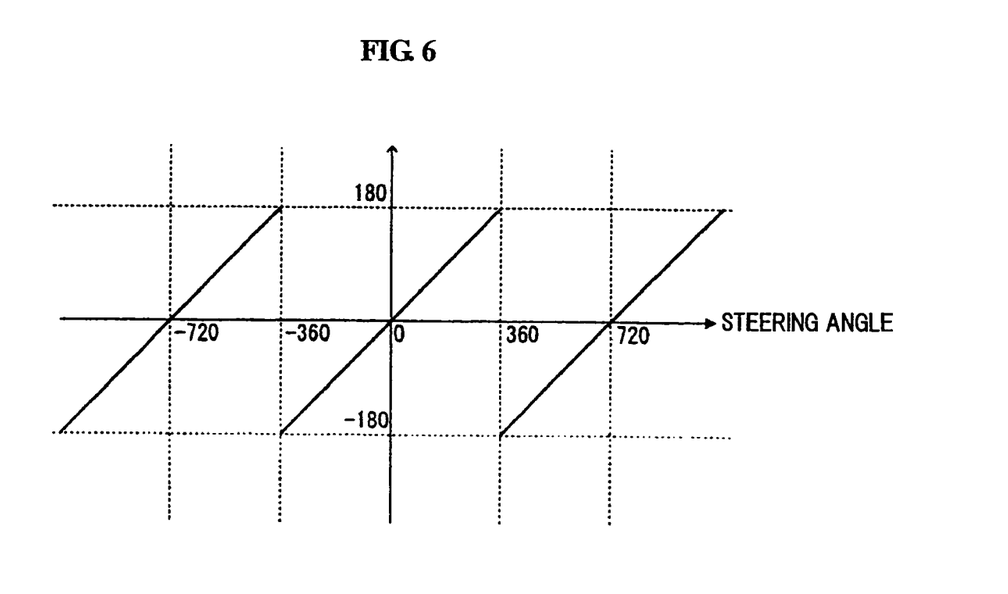
FIG. 6 is a graph illustrating a change in arctanθ obtained from signals in FIG. 5.

A magnetic resistance element section (hereinafter, GMR bridge circuit section) 27 that detects a change in a magnetic field from the magnetizing portion 26 is arranged in the sensor wheel 23, and the GMR bridge circuit section 27 is fixed to a part of a case of the steering angle sensor 19. A pair of first and second magnetic resistance elements (hereinafter, GMR bridge circuits) 27a and 27b are arranged in the GMR bridge circuit section 27, so that a phase is shifted by 90° according to an angle of the sensor wheel 23. That is to say, when a waveform to be output from the first GMR bridge circuit 27a is designated by sinθ and a waveform to be output from the second GMR bridge circuit 27b is designated by cosθ, the waveforms sinθ and cosθ with respect to the steering angle of the steering shaft 1 are as shown in FIG. 5, and a change in arctanθ as shown in FIG. 6 can be obtained according to an calculation in FIG. 8, mentioned later.

Further, the first and second GMR bridge circuits 27a and 27b are connected serially and are arranged orthogonally so as to operate as a three-terminal circuit element. A rotational angle of a body of rotation, namely, the sensor wheel 23 is detected by utilizing a change in resistance value of the element according to a change in the magnetic field strength. That is to say, since the first and second GMR bridge circuits 27a and 27b are arranged orthogonally to each other, shifts of output signals from the first and second GMR bridge circuits 27a and 27b shift by 90° as shown in FIG. 5.

Figure 7:
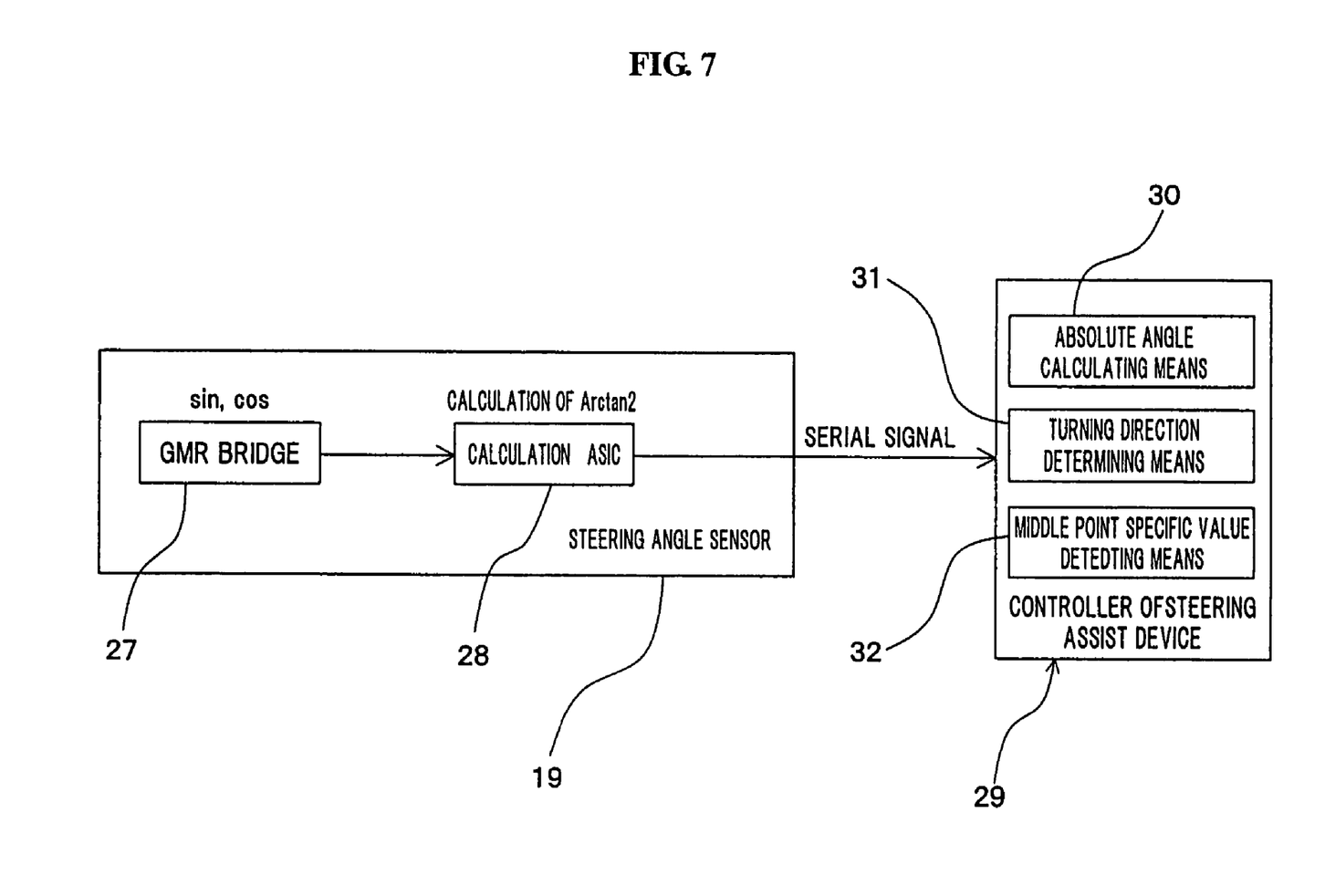
FIG. 7 is a diagram illustrating a schematic constitution of a steering angle calculating system.
Figure 9:
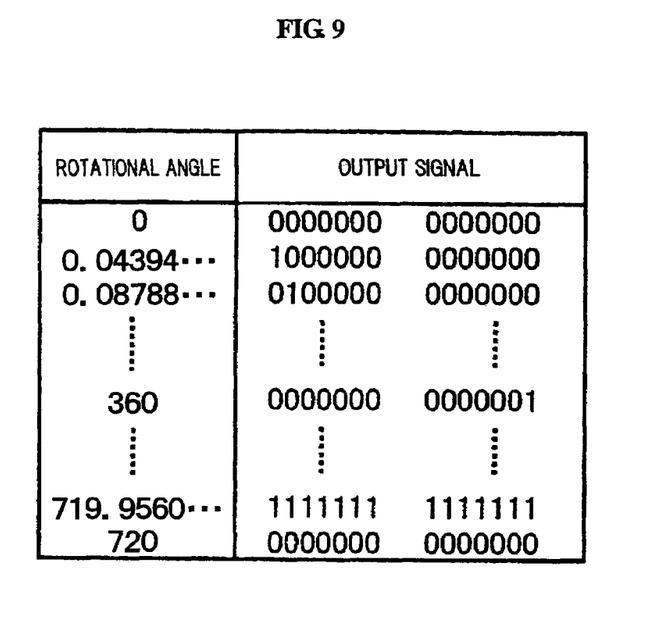
FIG. 9 is a diagram illustrating an allocation rule of signal data.

FIG. 7 is a diagram illustrating a schematic constitution of a steering angle calculating system. In the drawing, in the steering angle sensor 19, an integrated circuit (ASIC) 28 performs an calculation of arctanθ based on the signals sinθ and cosθ from the GMR bridge 27, and the calculated results are converted into output signals according to a predetermined allocation rule as shown in FIG. 9, so that the output signals are serially output to a controller 29 of a steering assist device. The controller 29 includes an absolute angle calculating means 30, a turning direction determining means 31 for determining a turning direction of the steering wheel based on vehicle information such as the wheel velocity and an SAT estimated value, and a middle point specific value detecting means 32 for storing a position where the rotational angle of the steering shaft 1 is 0°, namely, a middle point position and detecting a specific value near the middle point.

The allocation rule in FIG. 9, therefore, shows a corresponding relationship between the output value from the sensor and the rotational angle of the steering shaft 1. Further, the output signal is according to an asynchronous method of a serial format, and the output value from the sensor and the rotational angle of the steering shaft 1 are displayed by three words. In the output signal, a plurality of words composed of a header (1 bit) and data (7 bits) are combined to be used. In this case, the output signal is composed of three words, the output value of the sensor is displayed by two words, and 16834 data are output with 14 bits. One word is used for horizontal parity check, and three words whose data are the same are output at the time of fail.

Figure 8:
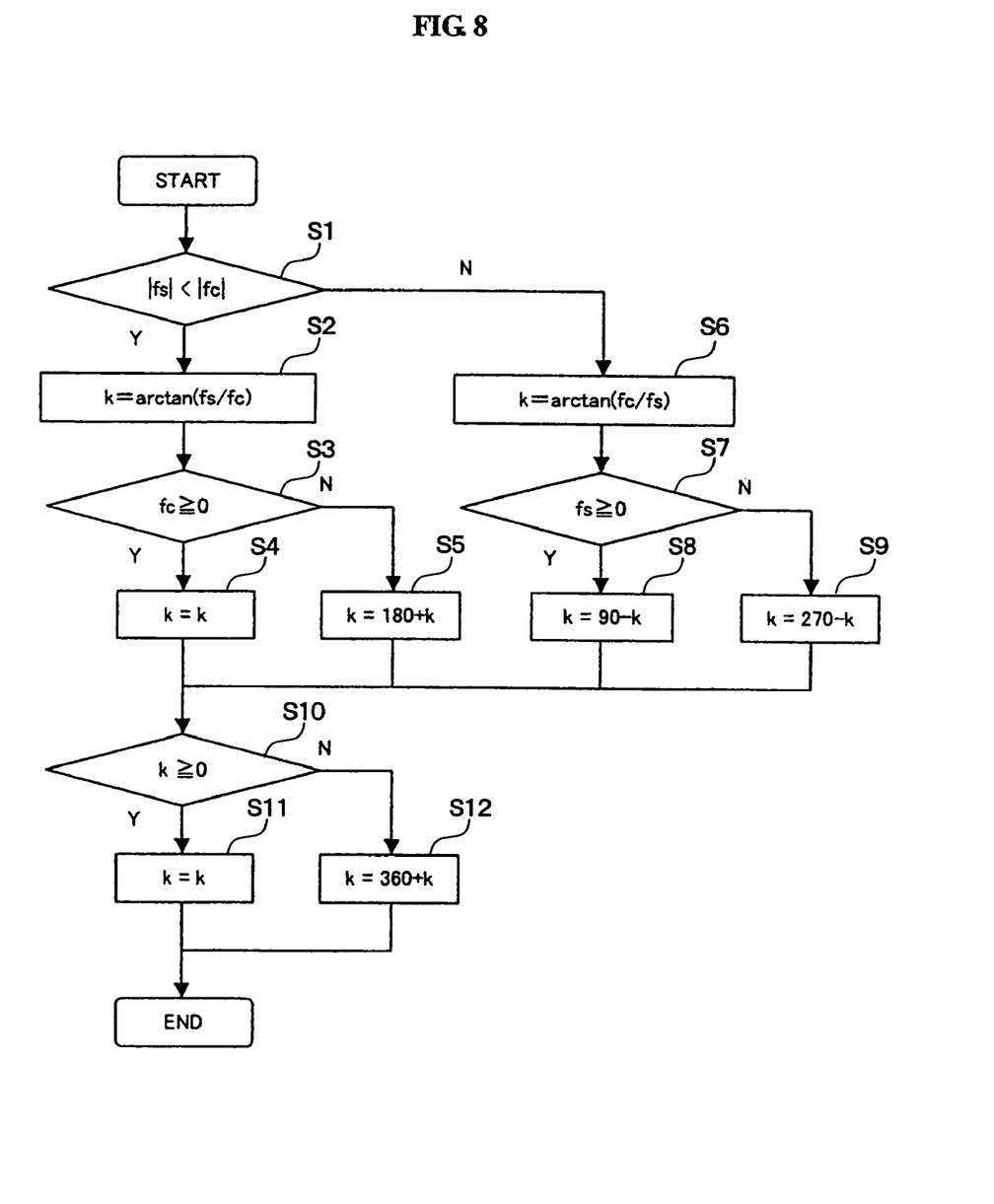
FIG. 8 is a flowchart illustrating algorithm of the steering angle calculation.

Steering angle calculating algorithm in the absolute angle calculating means 30 is explained below with reference to FIG. 8.

Levels of fs (sine wave detected by the first GMR bridge circuit 27a with respect to the steering angle) and fc (cosine wave detected by the second GMR bridge circuit 27b with respect to the steering angle) are compared using absolute values at step S1. When the absolute value of fc is larger than the absolute value of fs, namely, YES, the sequence goes to step S2. An arctan value (k) with respect to fs/fc is obtained at step S2, and a determination is made whether fc is not less than 0 at step S3. When fc is not less than 0, its value (k=k) is set for k at step S4, and when fc is smaller than 0, a value obtained by adding 180° to k (k=k+180) is set for k at step S5.

When the absolute value of fs is not less than the absolute value of fc, namely, NO at step S1, an arctan value (k) with respect to fc/fs is obtained at step S6, and a determination is made whether fs is not less than 0 at step S7. When fs is not less than 0, a value obtained by subtracting k from 90° (k=90−k) is set for k at step S8, and when fs is smaller than 0, a value obtained by subtracting k from 270° (k=270−k) is set for k at step S9.

A determination is made whether the values k set at steps S4, S5, S8 and S9 are not less than 0 at step S10. When k is not less than 0, its value (k=k) is set for k at step S11, and when k is smaller than 0, a value obtained by adding 360° to k (k=360+k) is set for k at step S12.

Figure 10:
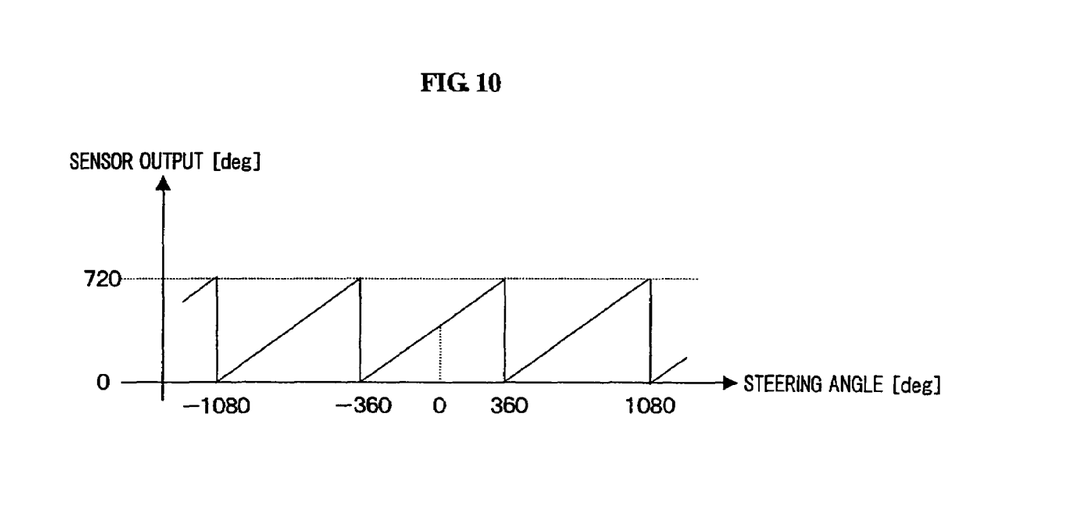
FIG. 10 is a graph illustrating a relationship between a sensor output value and a rotational angle of a steering shaft.

As a result, as shown in FIG. 10, a relationship between the output value of the sensor and the rotational angle of the steering shaft 1 is obtained. Therefore, when the steering angle is detected by a change in the resistance values of the first and second GMR bridge circuits 27a and 27b, its absolute steering angle can be obtained according to a change in the magnetic field of the magnetizing portion 26.

The absolute steering angle is determined by the turning direction determining means 31 and the middle point specific value detecting means 32 based on the result of the absolute angle calculating means 30. The turning direction determining means 31 determines the turning direction of the steering wheel based on an SAT estimated value derived by signals of a rotational angular velocity and assist power of the motor using the wheel velocity or inertia or static friction of the motor as a constant. The middle point specific value detecting means 32 stores a position of the middle point (rotational angle: 0°) of the steering shaft 1, and detects a specific value near the middle point so as to determine the absolute steering angle. That is to say, the position of the middle point does not become constant at the time of assembling the steering shaft 1 or the like. For this reason, an output value $\theta_0$ from the sensor is detected in a position where the rotational angle of the steering wheel is 0°, and this value is set as the middle point.

That is to say, when the sensor output value is designated by $\theta_{out}$, the absolute steering angle $\theta$ is $\theta_{out}-\theta_0$, and when a number of switching times from a maximum value into a minimum value of the sensor output can be counted n times, the absolute steering angle can be calculated according to the mathematical expression 1.

$$\theta = n*720 + \theta_{out} - \theta_0 \qquad \text{(Mathematical expression 1)}$$

Since n is determined by estimating a certain steering angle from the wheel velocity or the SAT estimated value at the first time after start-up and thereafter by counting the switching times from the maximum value into the minimum value of the sensor output, the absolute steering angle can be calculated based on the mathematical expression 1.

Figure 11:
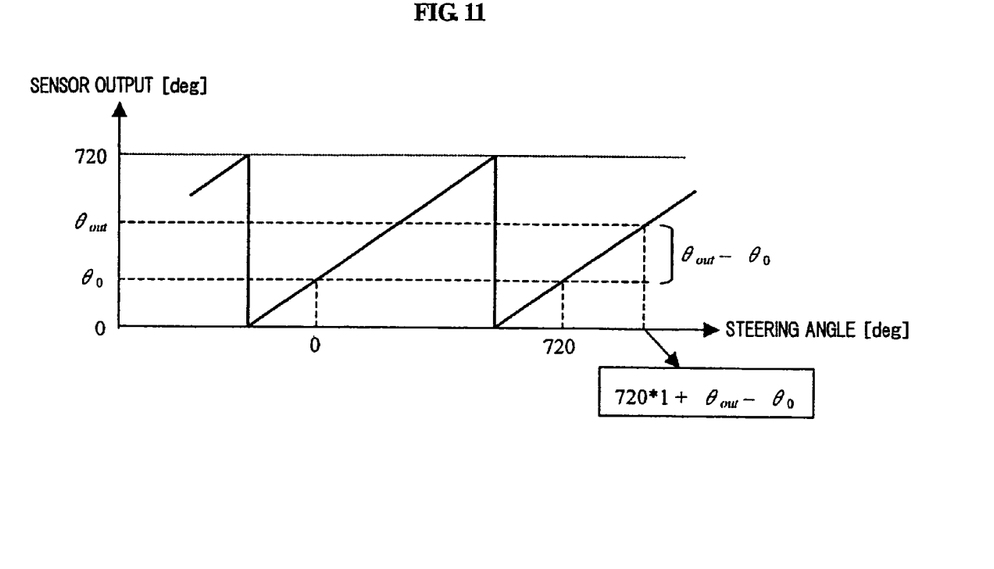
FIG. 11 is a graph illustrating a relationship between a sensor output $\theta_{out}$ and an actual steering angle.

The actual rotational angle of the steering wheel is lock-to-lock, and narrower than ±720°. For this reason, the output from the steering angle sensor in the vehicle is less than two cycles, and as shown in FIG. 11, the same value is output from at most only two places, and these places are separated by 720°. The steering angle, therefore, may be estimated by the wheel velocity or the SAT estimated value with accuracy of 720°. That is to say, it is only necessary to be capable of determining the turning direction.

Figure 12:
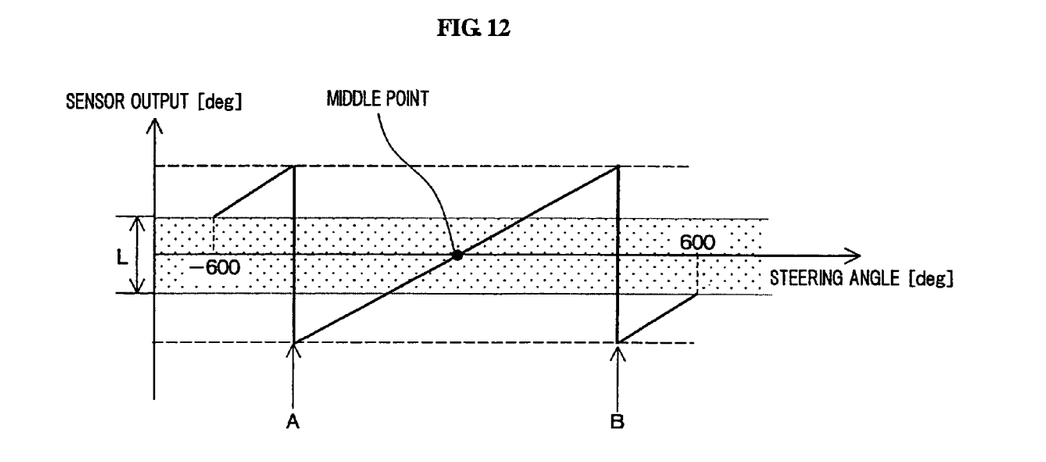
FIG. 12 is a graph illustrating a relationship between the sensor output $\theta_{out}$ and the actual steering angle in a lock-to-lock range.

Further, the actual lock-to-lock range in the steering of the steering wheel is smaller than ±720°, and normally about 1.5 turn (540°). For this reason, as shown in FIG. 12, when the lock-to-lock range is, for example, ±600°, the specific value near the middle point is in a range designated by L in the drawing. The specific value near the middle point, therefore, can specify n in the mathematical expression 1 without detecting the vehicle information and estimating the turning direction.

For this reason, in the range of the specific value near the middle point, the number of switching times does not have to be counted, and thus the absolute steering angle of the steering shaft 1 can be detected quickly. Thereafter, the absolute steering angle can be calculated repeatedly according to the calculation in FIG. 11.

INDUSTRIAL APPLICABILITY OF THE INVENTION

The steering angle sensor of the present invention is suitable to be used as a means for detecting a steering angle in a steering apparatus, and is useful particularly for the case where the absolute angle is desired to be detected inexpensively and quickly.

The invention claimed is:

1. A steering angle sensor that detects a rotational angle of a steering system whose steering is assisted by driving of an electric motor via a reduction mechanism so as to calculate a steering angle of a steering wheel, comprising:
    a sensor wheel operating simultaneously with rotation of a steering shaft; and
    an absolute angle calculating means for calculating an absolute steering angle based on a steering angle signal from the sensor wheel;
    wherein the sensor wheel includes a GMR element and a magnetizing portion arranged around the GMR element, and
    wherein the rotational angle is detected by making two turns of the steering shaft as one cycle of the steering angle signal based on a change in resistance value of the GMR element obtained by changing a magnetic field direction according to a rotation of the magnetizing portion, and further detected based on the steering angle of the steering wheel by making two turns of the steering shaft as one cycle of the steering angle signal by adjusting a moderation ratio between the sensor wheel and the steering shaft.

2. The steering angle sensor according to claim 1, wherein the GMR element is composed of two GMR bridge circuits, and is arranged so that phases of output signals from the GMR bridge circuits shift by 90°.

3. The steering angle sensor according to claim 1, further comprising:
   a turning direction determining means for determining a turning direction of the steering shaft; and
   a middle point specific value detecting means for storing a position of a middle point of the steering shaft and detecting a predetermined value near the middle point so as to calculate the absolute steering angle in an entire steering angle range based on the predetermined value.

4. The steering angle sensor according to claim 3, wherein the turning direction determining means can determine the steering angle with accuracy of at least 720°.

* * * * *